United States Patent
Lim et al.

(10) Patent No.: US 11,145,895 B2
(45) Date of Patent: Oct. 12, 2021

(54) MULTILAYER ELECTROLYTE CELL, SECONDARY BATTERY COMPRISING MULTILAYER ELECTROLYTE CELL AND MANUFACTURING METHOD THEREFOR

(71) Applicants: LG Chem, Ltd., Seoul (KR); UNIST (Ulsan National Institute of Science and Technology), Ulsan (KR)

(72) Inventors: Seongyoon Lim, Daejeon (KR); Jiyoon Kwon, Daejeon (KR); Seok Koo Kim, Daejeon (KR); Heojin Hah, Daejeon (KR); Youngsik Kim, Ulsan (KR); Hyunji Choi, Ulsan (KR); Jaekwang Kim, Ulsan (KR); Seongwoo Hur, Ulsan (KR)

(73) Assignees: LG Chem, Ltd.; UNIST (Ulsan National Institute of Science and Technology)

( * ) Notice: Subject to any disclaimer, the term of this patent is extended or adjusted under 35 U.S.C. 154(b) by 95 days.

(21) Appl. No.: 15/778,125

(22) PCT Filed: Jul. 7, 2017

(86) PCT No.: PCT/KR2017/007282
§ 371 (c)(1),
(2) Date: May 22, 2018

(87) PCT Pub. No.: WO2018/009018
PCT Pub. Date: Jan. 11, 2018

(65) Prior Publication Data
US 2018/0358652 A1      Dec. 13, 2018

(30) Foreign Application Priority Data
Jul. 8, 2016   (KR) .................. 10-2016-0087037

(51) Int. Cl.
H01M 10/0562 (2010.01)
H01M 50/451 (2021.01)
(Continued)

(52) U.S. Cl.
CPC ......... *H01M 10/0562* (2013.01); *H01M 4/13* (2013.01); *H01M 10/0585* (2013.01); *H01M 10/42* (2013.01); *H01M 2300/0074* (2013.01)

(58) Field of Classification Search
None
See application file for complete search history.

(56) References Cited

U.S. PATENT DOCUMENTS 9,029,023 B2   5/2015 Choi
2002/0197536 A1   12/2002 Mori et al.
(Continued)

FOREIGN PATENT DOCUMENTS

CN   101449416 A   6/2009
CN   104350632 A   2/2015
(Continued)

OTHER PUBLICATIONS

English translation of KR20160026648 (Year: 2016).*
(Continued)

*Primary Examiner* — Yoshitoshi Takeuchi
(74) *Attorney, Agent, or Firm* — Lerner, David, Littenberg, Krumholz & Mentlik, LLP (57) ABSTRACT

The present invention relates to a multilayer electrolyte cell, a secondary battery including the multilayer electrolyte cell, and a manufacturing method thereof, and more particularly, to a multilayer electrolyte cell, in which electrolytes are configured in multiple layers by stacking polymer coating layers containing ceramic solid electrolytes and liquid electrolytes including an ionic liquid in a porous structure base,
(Continued)

a secondary battery including the multilayer electrolyte cell, and a manufacturing method thereof.

19 Claims, 7 Drawing Sheets

(51) Int. Cl.
*H01M 50/449* (2021.01)
*H01M 50/454* (2021.01)
*H01M 50/457* (2021.01)
*H01M 50/489* (2021.01)
*H01M 50/491* (2021.01)
*H01M 50/494* (2021.01)
*H01M 50/497* (2021.01)
*H01M 10/0585* (2010.01)
*H01M 4/13* (2010.01)
*H01M 10/42* (2006.01)

(56) References Cited

U.S. PATENT DOCUMENTS

| | | | | |
|---|---|---|---|---|
| 2004/0146786 | A1* | 7/2004 | Sato | H01G 9/038 |
| | | | | 429/326 |
| 2010/0151335 | A1 | 6/2010 | Senga et al. | |
| 2014/0099540 | A1* | 4/2014 | Chen | H01M 4/505 |
| | | | | 429/211 |
| 2014/0178775 | A1 | 6/2014 | Lee et al. | |
| 2015/0125731 | A1 | 5/2015 | Ro et al. | |
| 2016/0064712 | A1 | 3/2016 | Hoerpel et al. | |
| 2016/0064770 | A1* | 3/2016 | Lee | H01M 4/382 |
| | | | | 429/303 |

FOREIGN PATENT DOCUMENTS

| | | | | |
|---|---|---|---|---|
| EP | 2905830 | A1 | 8/2015 | |
| FR | 3018395 | A1 | 9/2015 | |
| JP | 2003059535 | A | 2/2003 | |
| JP | 2009218005 | A | 9/2009 | |
| KR | 20130104858 | A | 9/2013 | |
| KR | 20130111833 | A | 10/2013 | |
| KR | 20150039255 | A | 4/2015 | |
| KR | 20160026648 | A | 3/2016 | |
| KR | 20160026648 | * | 3/2019 | H01M 10/052 |
| WO | 9954953 | A1 | 10/1999 | |
| WO | 2005104269 | A1 | 11/2005 | |

OTHER PUBLICATIONS

Search report from International Application No. PCT/KR2017/007282, dated Oct. 18, 2017.
Extended European Search Report including Written Opinion for Application No. EP17824574.2 dated Jul. 13, 2018.
Chinese Search Report for Application No. 201780003991.0 dated Aug. 11, 2020, 2 pages.

* cited by examiner

MULTILAYER ELECTROLYTE CELL, SECONDARY BATTERY COMPRISING MULTILAYER ELECTROLYTE CELL AND MANUFACTURING METHOD THEREFOR

CROSS-REFERENCE TO RELATED APPLICATION

This application is a national phase entry under 35 U.S.C. 371 of International Application No. PCT/KR2017/007282, filed on Jul. 7, 2017 which claims priority to Korean Patent Application No. 10-2016-0087037, filed on Jul. 8, 2016, the disclosures of which are incorporated herein by reference in their entirety.

TECHNICAL FIELD

This application claims priority to and the benefit of Korean Patent Application No. 10-2016-0087037 filed in the Korean Intellectual Property Office on Jul. 8, 2016, the entire contents of which are incorporated herein by reference.

The present invention relates to a multilayer electrolyte cell, a secondary battery including the multilayer electrolyte cell, and a manufacturing method thereof, and more particularly, to a multilayer electrolyte cell, in which electrolytes are configured in multiple layers by stacking polymer coating layers containing ceramic solid electrolytes and liquid electrolytes including an ionic liquid in a porous structured base, a secondary battery including the multilayer electrolyte cell, and a manufacturing method thereof.

BACKGROUND ART

In recent years, as the use of portable electronic devices such as notebook computers, mobile phones, and the like has been rapidly increasing, a secondary battery technology for supplying power to the devices also has attracted much attention. As the performance of the devices has improved, power consumption has also increased, and as a result, the need for high capacity and high voltage batteries is also emerging. Therefore, the performance of a secondary battery has been considerably improved based on efforts of many engineers to overcome disadvantages of a secondary battery in the related art and design a high performance and high efficiency battery, but the reality is that there are still many limitations.

A structure of a lithium ion secondary battery is constituted by the three elements of a cathode active material, an anode active material, and an electrolyte. Lithium ions move from an anode to a cathode and from the cathode to the anode, and as a result, a battery action is in progress.

An electrolyte portion functions only as a lithium ion conductor. In a widely used lithium ion secondary battery, an electrolyte solution in which a lithium salt is dissolved in an aprotic organic solvent is used.

However, although liquid electrolytes have an advantage of exhibiting high ion conductivity, the liquid electrolytes are basically environmentally unfavorable as an acid solution and involve a risk of leakage. Further, since a cathode electrolyte and an anode electrolyte are not separated from each other, the liquid electrolytes are not electrochemically safe and a half cell test is impossible.

Accordingly, research on the solid electrolytes has been actively conducted to overcome problems of the liquid electrolytes, but the solid electrolytes in the related art have a problem of high interfacial resistance and low ion conductivity due to a point contact between the electrodes and the solid electrolyte.

In addition, in order to preoccupy markets of electric vehicles and electric power storage, high voltage and high capacity battery technology of the lithium ion battery must be ensured, and to this end, it is essential to develop a high voltage anode.

However, in the case of the secondary battery in the related art, since the anode and cathode electrolytes made of the same composition are included in order to stabilize both the anode and the cathode, a range of the anode active material that can be used for the lithium secondary battery is limited and the high voltage anode cannot be used.

Further, in the lithium secondary battery in the related art, by using the anode and cathode electrolytes of the same composition, an additional problem occurs due to the electrolyte and there is a problem in that the accurate characteristics of the high voltage anode cannot be determined because characteristics of the anode cannot be maximized.

DETAILED DESCRIPTION OF THE INVENTION

Technical Problem

In order to solve the problem, an object of the present invention is to provide a multilayer electrolyte cell in which respective electrode electrolytes are physically separated by forming a polymer coating layer including a cathode electrolyte on the surface of a cathode and bonding a ceramic solid electrolyte containing an anode electrolyte to an anode.

Further, an object of the present invention is to provide a multilayer electrolyte cell in which the ceramic solid electrolyte and the polymer coating layer are physically separated from each other to prevent an anode material from penetrating the cathode, easily determine accurate characteristics of a high voltage/high capacity anode active material, and contain a high voltage/high capacity anode electrolyte.

In addition, an object of the present invention is to provide a multilayer electrolyte cell in which the anode electrolyte is contained in the ceramic solid electrolyte, and as a result, a polymer electrolyte layer between the anode and the ceramic solid electrolyte is enabled to be omitted and a thickness is small and manufacturing cost is relatively low, and as a result, it is economical.

Technical Solution

A multilayer electrolyte cell according to an embodiment of the present invention may include: a ceramic solid electrolyte; an anode located on one side of the ceramic solid electrolyte; a cathode located on the other side of the ceramic solid electrolyte; and a polymer coating layer formed between the ceramic solid electrolyte and the cathode, in which the ceramic solid electrolyte may include an ionic liquid in a porous structure base.

Preferably, the porous structure base may include at least one inorganic ceramic selected from a group consisting of $LiTiO_3$ (LLTO), $Li_{1+x}Al_xTi_{2-x}(PO_4)_3$ (LTAP), $Li_7La_3Zr_2O_{12}$ (LLZO), and $Li_{1+x}Ti_{2-x}Al_xSi_y(PO_4)_{3-y}$ (where, $0<x<1$, $0<y<1$) and a Teflon-based binder.

Preferably, the binder may be polyvinylidene fluoride (PVDF).

Preferably, the ionic liquid may include at least one of 1-ethyl-3-methyl imidazolium, 1-butyl-3-methyl imidazolium, 1-butyl-1-methyl pyrrolidinium, 1-methyl-1-proply piperidinium, bis (trifluoromethylsulfonyl) imide (TFSI), and trifluoromethanesulfonate.

Preferably, the anode may include any one of $xLi_2MnP_{3+(1-x)}LiMO_2$, $LiNi_{0.5}Mn_{1.5}O_4$, $LiCoPO_4$, $LiNiPO_4$, and $Li_2CoPO_4F$.

Preferably, the polymer coating layer may include any one or more of a high molecular polymer, a liquid electrolyte, a lithium salt, and an initiator. Preferably, the high molecular polymer may include any one of ETPTA, PEO, PAN, PVdF and PMMA, the liquid electrolyte may include any one of an ether-based liquid electrolyte and a carbonate-based liquid electrolyte, the lithium salt may include any one or more of LiPFSi, $LiPF_6$, $LiClO_4$, $LiAsF_6$, $LiBF_4$, $LiCF_3SO_3$, and $Li(CF_3SO_2)2N$, and the initiator may include 2-hydroxy-2-methylpropiophenone.

Further, a manufacturing method of a secondary battery including a multilayer electrolyte cell according to an embodiment of the present invention may include: (a) forming a polymer coating layer on a cathode; (b) stacking a ceramic solid electrolyte on an anode; and (c) stacking the ceramic solid electrolyte and the cathode so that the polymer coating layer is positioned between the ceramic solid electrolyte and the cathode.

Preferably, step (a) may include (a1) preparing a polymer coating solution by mixing any one or more of a high molecular polymer, a liquid electrolyte, a lithium salt, and an initiator.

Preferably, step (a1) may include preparing an electrolyte mixture solution by mixing the high molecular polymer, the liquid electrolyte, and the lithium salt, and preparing a coating solution by mixing the initiator with the electrolyte mixture solution.

Preferably, in step (a1), the high molecular polymer, the liquid electrolyte, and the lithium salt may be mixed in a ratio of 40 to 60 wt %, 20 to 40 wt %, and 5 to 20 wt %, respectively.

Preferably, in step (a1), the initiator may be mixed in a weight ratio of 0.5 to 1.5% of a weight of the electrolyte mixture solution.

Preferably, step (b) may include (b1) preparing a porous structure base, (b2) preparing the ceramic solid electrolyte by impregnating an ionic liquid in the porous structure base, and (b3) stacking the ceramic solid electrolyte on the anode.

Preferably, step (b1) may include synthesizing ceramic powder by heat-treating a ceramic precursor, preparing a mixture solution by wet-mixing any one or more of the ceramic powder, a precursor, and a binder, generating mixture powder by spraying and drying the mixture solution, compressing the mixture powder, and forming the porous structure base by heat-treating the mixture powder.

Preferably, in the synthesizing of the ceramic powder, the ceramic precursor may be heat-treated at a temperature of 700 to 900° C.

Preferably, in the preparing of the mixture solution, the mixture solution may be mixed for 15 to 25 hours using any one of a ball mill, a rod mill, a vibrating mill, a centrifugal impact mill, a bead mill, and an attrition mill.

Preferably, in the generating of the mixture powder, the mixture powder may be sprayed-dried at a temperature of 100 to 200° C.

Preferably, the compressing of the mixture powder may include mixing and compressing the mixture powder and a powder precursor, and compressing the compressed mixed powder and the powder precursor by cold isostatic pressing.

Preferably, in the mixing and compressing of the mixture powder and the powder precursor, the mixture powder and the powder precursor may be compressed at a pressure of 20 to 50 MPa.

Preferably, in the compressing of the compressed mixed powder and the powder precursor by the cold isostatic pressing, the mixture powder and the powder precursor may be compressed at a pressure of 1500 to 2500 $kg/cm^2$.

Advantageous Effects

According to the problem solving means of the present invention, the ionic liquid is impregnated into the porous structure base, thereby reducing interfacial resistance between the ceramic solid electrolyte and the anode and increasing the ion conductivity.

Further, the polymer coating layer is stacked on one side of the ceramic solid electrolyte to form a multilayer electrolyte, thereby separating the multilayer electrolyte into the anode portion including the anode and the ceramic solid electrolyte and the cathode portion including the cathode and the polymer coating layer and minimizing the additional problems due to the problems in determining characteristics of the anode.

In addition, by physically separating the anode portion and the cathode portion from each other, each electrode active material does not affect the anode portion and the cathode portion, thereby selectively using an electrolyte suitable for each electrode.

BEST MODE

The present invention will be described below in detail with reference to the accompanying drawings. Herein, the repeated description and the detailed description of publicly-known function and configuration that may make the gist of the present invention unnecessarily ambiguous will be omitted. The embodiment of the present invention is provided to more completely describe the present invention to those skilled in the art. Accordingly, shapes, sizes, and the like of elements in the drawings may be exaggerated for clearer explanation.

Throughout the specification, unless explicitly described to the contrary, a case where any part "includes" any component will be understood to imply the inclusion of stated components but not the exclusion of any other component.

Hereinafter, a preferred embodiment is presented in order to assist understanding of the present invention. However, the following embodiment is just provided to more easily understand the present invention and contents of the present invention are not limited by the embodiment.

<Multilayer Electrolyte Cell>

Figure 1:
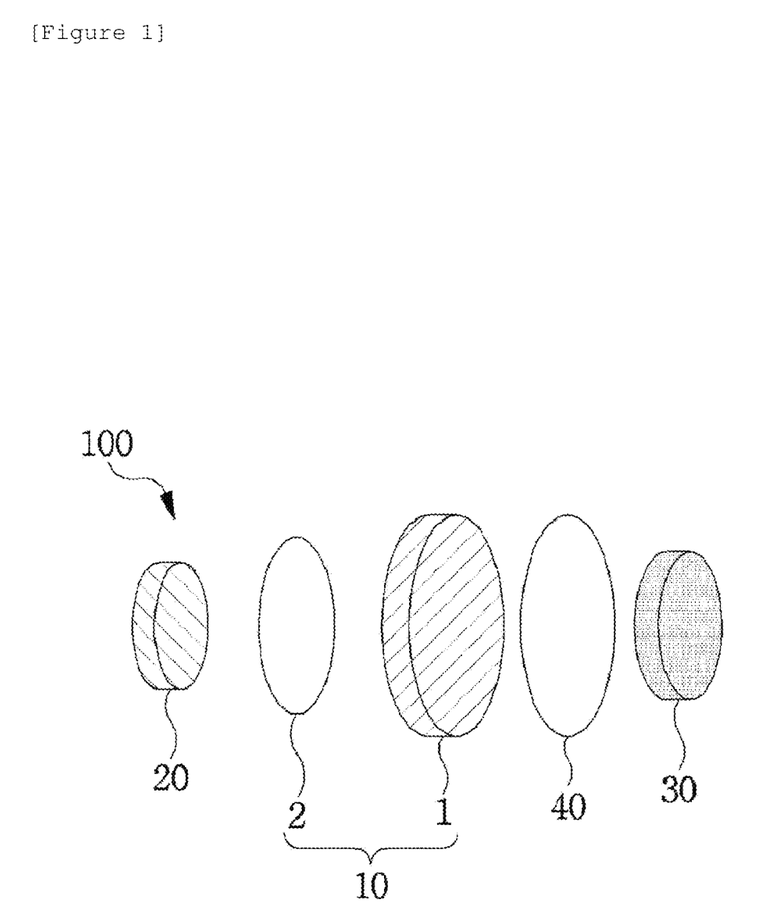
FIG. 1 is an exploded view illustrating a multilayer electrolyte cell according to an embodiment of the present invention.
Figure 2:
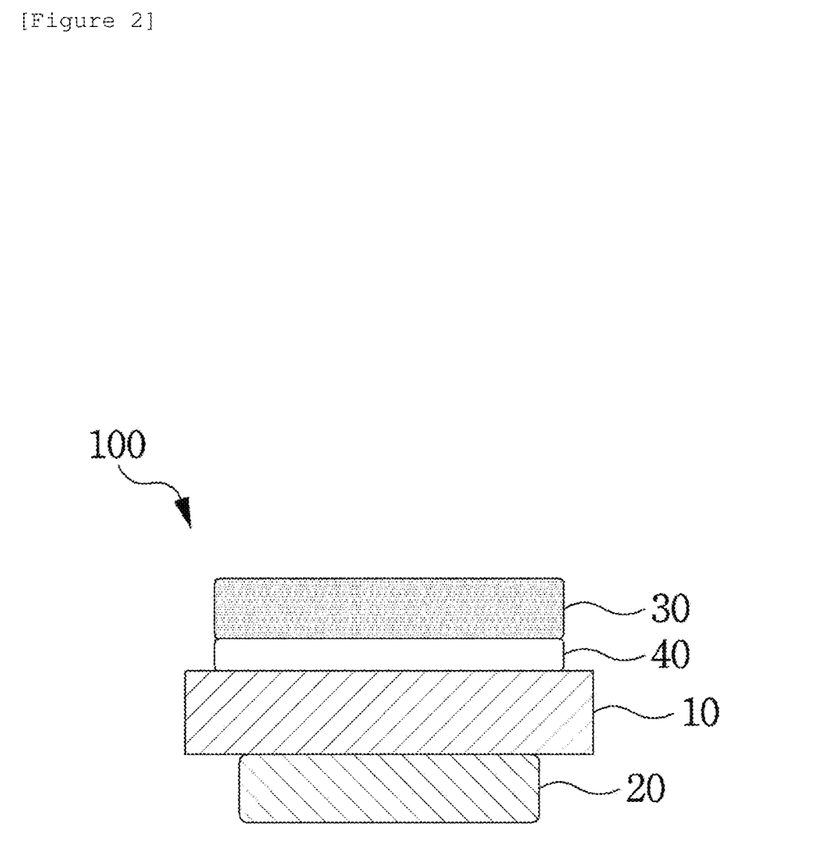
FIG. 2 is a cross-sectional view schematically illustrating the multilayer electrolyte cell according to an embodiment of the present invention.

FIG. 1 is an exploded view illustrating a multilayer electrolyte cell 100 according to an embodiment of the present invention. FIG. 2 is a cross-sectional view illustrating the multilayer electrolyte cell 100 according to an embodiment of the present invention. Referring to FIGS. 1 and 2, the multilayer electrolyte cell 100 according to the present invention may include a ceramic solid electrolyte 10, an anode 20 located on one side of the ceramic solid electrolyte 10, a cathode 30 located on the other side of the ceramic solid electrolyte 10, and a polymer coating layer 40 formed between the ceramic solid electrolyte 10 and the cathode 30 and in addition, in the ceramic solid electrolyte 10, an ionic liquid 2 may be included in a porous structure base 1.

Herein, the ceramic solid electrolyte 10 and the anode 20 are included to be referred to as an anode portion and the polymer coating layer 40 and the cathode 30 are included to be referred to as a cathode portion.

The ceramic solid electrolyte 10 may generally serve as a separator and an electrolyte of a secondary battery, the separator may serve to separate the anode 20 and the cathode 30, and the electrolyte may serve as an intermediate mediator which enables ions of the anode 20 and the cathode 30 to move. Therefore, the ceramic solid electrolyte 10 may serve as the separator and include the porous structure base 1 through which lithium ions may pass and the ionic liquid 2 serving as the electrolyte.

The porous structure base 1 may be made of a material having high ionic conductivity and excellent electrochemical stability for diffusing lithium ions. For example, the porous structure base 1 may be made of inorganic ceramics such as sulfides, oxides, and phosphides. Examples of sulfide-based inorganic ceramics include $Li_2S$—$P_2S_5$, $Li_2S$—$P_2S_5Li_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$ (Thio-LISICON), and the like and are high in ion conductivity and great in reactivity with moisture. Examples of oxide-based inorganic ceramics include $(La,Li)TiO_3(LLTO)((La,Li)=La$ and $Li)$, $Li_6La_2CaTa_2O_{12}$, $Li_6La_2ANb_2O_{12}$ (A=Ca or Sr), $Li_2Nd_3TeSbO_{12}$, $Li_3BO_{2.5}N_{0.5}$, $Li_9SiAlO_8$, and the like and examples of phosphide-based inorganic ceramics include $Li_{1+x}Al_xGe_{2-x}(PO_4)_3$ (LAGP), $Li_{1+x}Al_xTi_{2-x}(PO_4)_3$ (LATP), $Li_{1+x}Ti_{2-x}Al_xSi_y(PO_4)_{3-y}$, $LiAl_xZr_{2-x}(PO_4)_3$, $Li_7La_3Zr_2O_{12}$ (LLZO), $LiTi_xZr_{2-x}(PO_4)_3$, and the like (where, $0<x<1$, $0<y<1$).

Herein, a sulfide-based solid electrolyte has a higher interfacial resistance between the electrode active material and the solid electrolyte than the organic electrolyte solution, and since hydrogen sulfide is generated by reacting with water, controlling humidity is particularly required. However, oxide-based and phosphide-based solid electrolytes are stable compounds and may be used as coating materials for electrodes and separators. In addition, since the oxide-based and phosphide-based solid electrolytes have lattice defects, a passage through which ions may move is formed to have high ion conductivity. Therefore, LATP or LLZO may be preferably used in the present invention.

In addition, the porous structure base 1 may include a Teflon-based material, such as PVDF, as a binder. Since PVDF has flexible mechanical properties, PVDF is contained in the ceramic solid electrolyte to produce an electrolyte that is flexible and excellent in ion conductivity in spite of a small thickness.

The ionic liquid 2 is impregnated into the porous structure base 1 as a liquid which is stable for the anode 20 to reduce the interfacial resistance between the ceramic solid electrolyte 10 and the anode 20. Further, when the high voltage anode 20 is used, deterioration of battery characteristics due to decomposition of the porous structure base 1 may be prevented.

Herein, the ionic liquid (2) as the high voltage electrolyte may contain at least one of 1-ethyl-3-methyl imidazolium, 1-butyl-3-methyl imidazolium, 1-butyl-1-methyl pyrrolidinium, 1-methyl-1-proply piperidinium, bis (trifluoromethylsulfonyl) imide (TFSI), and trifluoromethanesulfonate.

The anode electrolyte in the related art may have problems in the operation of the secondary battery when an electrochemical safety window of the electrolyte which is approximately 4.5 V is used together with a high voltage anode of approximately 4.8 V or higher. However, when the ionic liquid 2 according to the present invention is used with the high voltage anode in the secondary battery, a range of the electrochemical safety window increases, and the ionic liquid 2 may be thermally and chemically stable and have high ion conductivity.

Further, by using the high voltage electrolyte, it is possible to secure the electrochemical stability of the secondary battery, to prevent the oxidative decomposition of the electrolyte, and to suppress dissolution of the anode active material.

The anode 20 generally serves to cause a reaction that reduces the anode active material by receiving electrons from an external wire in the second battery. The anode 20 used in the multilayer electrolyte cell 100 according to the present invention may include a high voltage anode material and may include, for example, any one of $xLi_2MnP_{3+(1-x)}LiMO_2$, $LiNi_{0.5}Mn_{1.5}O_4$, $LiCoPO_4$, $LiNiPO_4$, and $Li_2CoPO_4F$.

Herein, the high voltage anode 20 may mean an anode material capable of stably inserting/desorbing Li ions when the electrons move in an oxidation/reduction reaction at a high voltage of 4.8 V or higher.

Since the multilayer electrolyte cell 100 according to the present invention may be physically divided into the anode portion and the cathode portion, different electrolytes may be used for the anode 20 and the cathode 30, and as a result, the high voltage anode electrolyte may be impregnated into the ceramic solid electrolyte 10 and characteristics of the high voltage anode 10 may be tested.

For example, as a result of a characteristic test of the secondary battery including the liquid electrolyte and the high voltage anode in the related art and the multilayer electrolyte cell 100 including the ceramic solid electrolyte 10 and the high voltage anode 20 according to the present invention, manganese is not formed on the surface of the cathode 30 in the case of the multilayer electrolyte cell 100 according to the present invention. That is, since a side reaction of the anode electrolyte does not occur, the cycle characteristics are superior to those of the secondary battery in the related art.

The cathode 30 generally reversibly absorbs/releases lithium ions discharged from the anode 20, thereby serving to cause an oxidation reaction in the secondary battery. In addition, the anode and cathode electrode 30 may contain lithium metal. The lithium metal is an element with a low oxidation/reduction potential of −3 V and has excellent characteristics in energy density determined by a capacity and operating voltage.

The polymer coating layer 40 serves to reduce the interfacial resistance between the cathode 30 and the ceramic solid electrolyte 10 and the polymer coating layer 40 may include at least one of a high molecular polymer, a liquid electrolyte, a lithium salt, and an initiator. Here, the high molecular polymer serves as a support for the polymer coating layer 40 and may include any one of ETPTA, PEO, PAN, PVdF and PMMA.

Further, the liquid electrolyte may include any one of an ether-based liquid electrolyte and a carbonate-based liquid electrolyte. The interfacial resistance between the ceramic solid electrolyte 10 and the cathode 30 may be reduced by the liquid electrolyte. Further, by including the ether-based and carbonate-based liquid electrolytes, direct side reactions between lithium and the ceramic solid electrolyte 10 may be suppressed. In addition, the carbonate-based electrolyte may include any one of ethylene carbonate (EC), dimethyl carbonate (DMC) and diethyl carbonate (DEC), and the ether-based electrolyte may include any one of dimethyl ether (DME), diglycol methyl ether, triethylene glycol dimethyl ether, and tetraethylene glycol dimethyl ether (TEGDME).

Furthermore, the carbonate-based electrolyte is excellent in pressure resistance, and as a result, the carbonate-based electrolyte has the effect of maintaining the chemical/electrical stability even at a high pressure. The ether-based electrolyte prevents a passive film from being formed on the electrode surface due to a discharge product of a solid phase, and insolubility of the electrolyte is caused by the passive film, so that the oxidation reaction does not occur due to charging, thereby solving a problem that the interfacial characteristic between the electrode and the electrolyte deteriorates.

The lithium salt may include any one or more of $LiPFSi$, $LiPF_6$, $LiClO_4$, $LiAsF_6$, $LiBF_4$, $LiCF_3SO_3$, and $Li(CF_3SO_2)2N$, and the initiator may include 2-hydroxy-2-methyl propiophenone. The polymer coating layer 40 may have conductivity by the lithium salt, and the polymer coating layer 40 may serve as a channel for the lithium ions when the secondary battery is driven.

Here, the polymer coating layer 40 may be positioned between the ceramic solid electrolyte 10 and the anode 20. In this case, the liquid electrolyte included in the polymer coating layer 40 as the anode electrolyte may include at least one of 1-ethyl-3-methyl imidazolium, 1-butyl-3-methyl imidazolium, 1-butyl-1-methyl pyrrolidinium, 1-methyl-1-proply piperidinium, bis (trifluoromethylsulfonyl) imide (TFSI), and trifluoromethanesulfonate. In addition, there is an effect that the interfacial resistance between the ceramic solid electrolyte 10 and the anode 20 may be reduced.

<Secondary Battery Including Multilayer Electrolyte Cell>

The secondary battery including the multilayer electrolyte cell 100 according to the embodiment of the present invention may include the multilayer electrolyte cell 100 according to an embodiment of the present invention. That is, the secondary battery may include the multilayer electrolyte cell 100, a cathode current collector, and an anode current collector.

The anode current collector is generally configured to be positioned above the anode 20 and may serve to collect electrons generated by the electrochemical reaction of the anode active material.

The cathode current collector is generally configured to be positioned above the cathode 30 and may serve to supply electrons required for the electrochemical reaction.

Further, the anode current collector and the cathode current collector are not particularly limited as long as they have electrical conductivity without causing a chemical change in the multilayer electrolyte cell 100 and since the existing known composition is used, a detailed description thereof will be omitted.

<Manufacturing Method of Secondary Battery Including Multilayer Electrolyte Cell>

Figure 3:
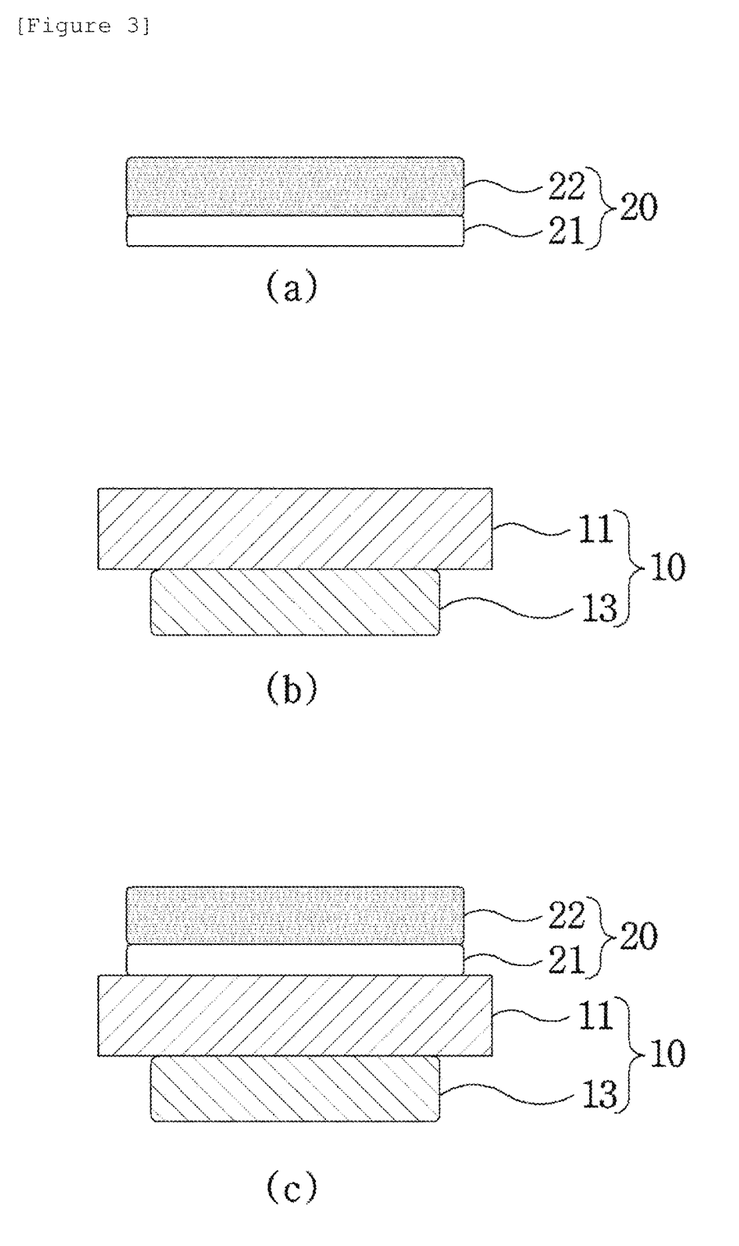
FIG. 3 is a diagram schematically illustrating a manufacturing method of a secondary battery including a multilayer electrolyte cell according to an embodiment of the present invention.
Figure 4:
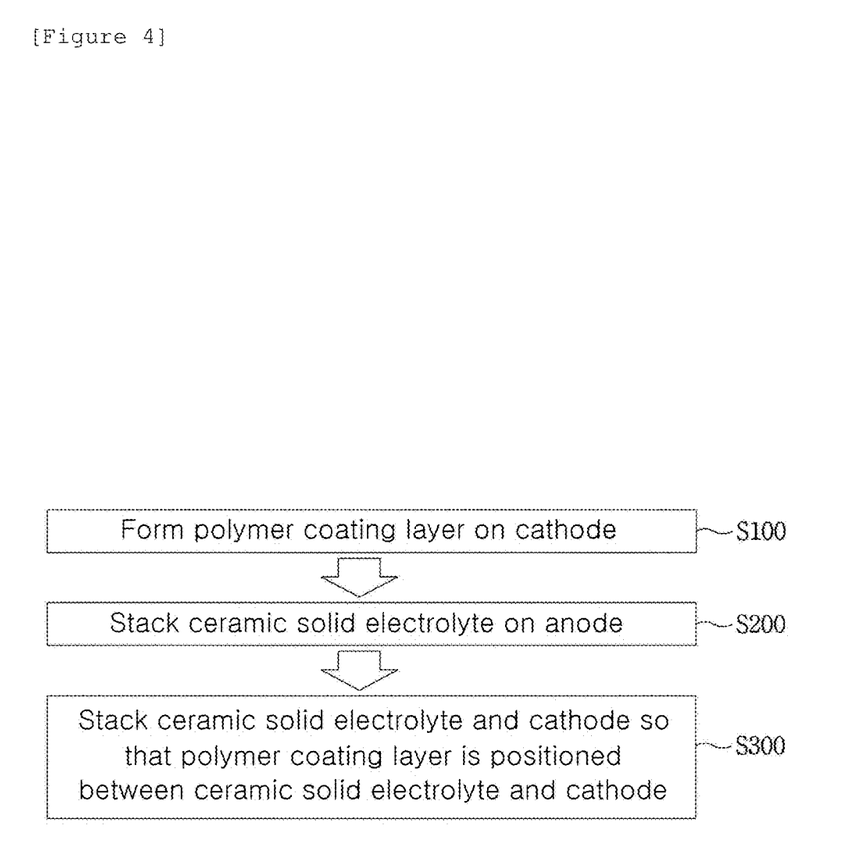
FIG. 4 is a flowchart of the manufacturing method of a secondary battery including a multilayer electrolyte cell according to an embodiment of the present invention.

FIG. 3 is a diagram schematically illustrating a manufacturing method of a secondary battery including a multilayer electrolyte cell 100 according to an embodiment of the present invention. FIG. 4 is a flowchart of the manufacturing method of a secondary battery including a multilayer electrolyte cell 100 according to an embodiment of the present invention. Referring to FIGS. 3 and 4, the manufacturing method of the secondary battery including the multilayer electrolyte cell 100 according to the present invention may include: (a) forming a polymer coating layer 40 on an cathode 30 (S100); (b) stacking a ceramic solid electrolyte 10 on an anode 20; and (c) stacking the ceramic solid electrolyte 10 and the cathode 30 so that the polymer coating layer 40 is positioned between the ceramic solid electrolyte 10 and the cathode 30.

The step (a) as a step of preparing a cathode portion may include (a1) preparing a polymer coating solution by mixing at least one of a high molecular polymer, a liquid electrolyte, a lithium salt, and an initiator (S110); and (a2) applying the polymer coating solution to the cathode 30 and then curing the applied polymer coating solution to form the polymer coating layer 40 (S120).

Further, step (a1) may include preparing an electrolyte mixture solution by mixing the high molecular polymer, a liquid electrolyte and a lithium salt (S111) and preparing a coating solution by mixing an initiator into the electrolyte mixture solution (S112).

Moreover, in step S111, in the case of a mixing ratio of the high molecular polymer, the liquid electrolyte, and the lithium salt, the high molecular polymer, the liquid electrolyte, and the lithium salt are mixed as a ratio of 40 to 60 wt % for the high molecular polymer, 20 to 40 wt % for the liquid electrolyte, and 5 to 20 wt % for the lithium salt to prepare the electrolyte mixture solution.

Herein, the liquid electrolyte as a cathode electrolyte may serve to reduce the interfacial resistance decrease between the ceramic solid electrolyte 10 and the cathode 30 and suppress the side reaction.

Further, the initiator mixed in the electrolyte mixture solution may be mixed at a weight ratio of 0.5 to 1.5% of the weight of the electrolyte mixture solution.

In this case, the initiator as an ultraviolet initiator may be cured by applying the polymer coating layer to the cathode 30 and thereafter, irradiating ultraviolet rays in step S112.

Step (b) as a step of preparing for the anode portion may include (b1) preparing a porous structure base 1 (S210); (b2) impregnating the porous structure base 1 with an ionic liquid 2 to prepare the ceramic solid electrolyte 10 (S220), and (b3) stacking the ceramic solid electrolyte 10 on the anode 20 (S230).

Here, after step (b2), step (b) may further include forming a polymer coating layer 40 on the anode 20 (S240). After the polymer coating liquid is applied to the surface of the anode 20, the polymer coating layer 40 may be formed through ultraviolet curing. In this case, it should be noted that the polymer coating layer 40 contains the anode electrolyte to reduce the interfacial resistance between the anode 20 and the ceramic solid electrolyte 10.

Step (b1) may include synthesizing ceramic powder by heat-treating a ceramic precursor (S211), wet mixing the at least one of the ceramic powder, a precursor, and a binder to prepare a mixture solution (S212), producing a mixture powder by spraying and drying the mixture solution (S213), compressing the mixture powder (S214), and forming the porous structure base 1 by heat-treating the mixture powder (S215).

Step S211 is a step of producing and synthesizing ceramic powder as a base of the porous structure base 1 and in step S211, the ceramic precursor may be heat-treated at a temperature of 700 to 900° C. to synthesize the ceramic powder. The composition of the ceramic powder may include at least one of lithium, titanium, aluminum, phosphoric acid, and zirconium.

Figure 5:
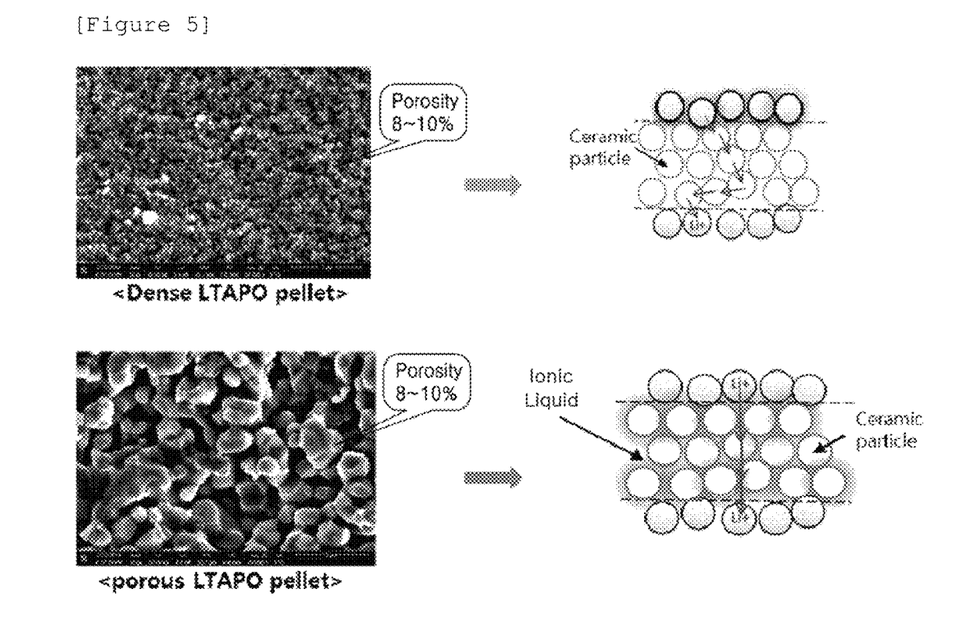
FIG. 5 is an SEM analysis photograph of a ceramic solid electrolyte depending on a ratio of ceramic powder and a precursor.

In step S212, a porosity of the porous structure base 1 is adjusted. The porosity of the porous structure base 1 may be adjusted by a ratio of the ceramic powder and the precursor. When the precursor is heat-treated, a gas component contained in the precursor sublimes and pores are generated. Therefore, as the proportion of the precursor increases, a pore generation amount increases. Referring to FIG. 5, FIG. 5a is an SEM photograph of the porous structure base 1 generated by using the mixture solution in which the ceramic powder and the precursor are mixed in a ratio of 3:1 and the porosity of the porous structure base 1 may be 8 to 15%. In addition, FIG. 5b is an SEM photograph of the porous structure base 1 generated by using the mixture solution in which the ceramic powder and the precursor are mixed in a ratio of 1:1 and the porosity of the porous structure base 1 may be 30 to 45%. As a result, the porosity of the porous structure base 1 is increased and the amount of the ionic liquid 2 impregnated in the porous structure base 1 is also increased as the ratio of the ceramic powder is decreased. Thus, the interfacial resistance between the ceramic solid electrolyte 10 and the anode 20 or between the ceramic solid electrolyte 10 and the cathode 30 decreases. That is, there is an effect that the resistance of the whole cell is reduced by the ionic liquid 2.

Therefore, it is noted that the ceramic powder and the precursor according to the present invention may be mixed in a ratio of 3:1 to 1:1 and the porosity of the porous structure base 1 is 8% to 45%. When the porosity is 8% or less, the ionic liquid 2 is not impregnated into the porous structure base 1, and as a result, the interfacial resistance between the ceramic solid electrolyte 10 and the cathode 30 or between the ceramic solid electrolyte 10 and the anode 20 may increase and side reactions may occur.

Moreover, in step S212, the mixture solution may be mixed for 15 to 25 hours using any one of a ball mill, a rod mill, a vibrating mill, a centrifugal impact mill, a bead mill, and an attrition mill.

In step S213 as a step of pulverizing the mixture solution, the mixture solution may be sprayed and dried at a temperature of 100 to 200° C. By spray-drying the mixture solution, the size of the generated powder may be adjusted. In this case, in spray-drying, the mixture solution may be pulverized by any one of a hot-air drying method, a spray-drying method, a freeze drying method, and a heat drying method. More specifically, the mixture solution may be pulverized at the same time as the spraying, by being sprayed at a high temperature with a constant size and at a constant flow rate of a droplet.

Step S214 may include mixing and compressing the mixture powder and a powder precursor, and compressing the compressed mixed powder and powder precursor by cold isostatic pressing. It is noted that the thickness of the porous structure base 1 may be adjusted by the compression and cold isostatic pressing, and no separate cutting and forming process is required.

In addition, in step S214, the compression may be performed at a pressure of 20 to 50 MPa, and in the case of the cold isostatic pressing, the compression may be performed at a pressure of 1500 to 2500 kg/cm$^2$.

In step S215, the compressed mixed powder and powder precursor are heated at a temperature of 700 to 900° C. for 2 to 4 hours to increase the porosity by sublimating a gas component which remains in the powder precursor.

In step S220, the porous structure base 1 may be impregnated with the ionic liquid 2 by applying the ionic liquid 2 to the porous structure base 1 and then maintaining a vacuum state. It is noted that inner point resistance of the ceramic solid electrolyte 10 and the interfacial resistance among the ceramic solid electrolyte 10, the anode 20, and cathode 30 may be reduced by the impregnated ionic liquid 2.

Step (c) is a step of stacking the anode portion and the cathode portion and it is noted that the ceramic solid electrolyte 10 and the polymer coating layer 40 are stacked to form a multilayer structure, thereby preventing the anode portion material from moving to the cathode portion and the anode portion and the cathode portion are separated from each other to determine characteristics of the compositions of the anode and cathode portions.

<Experimental Example 1>

Figure 6:
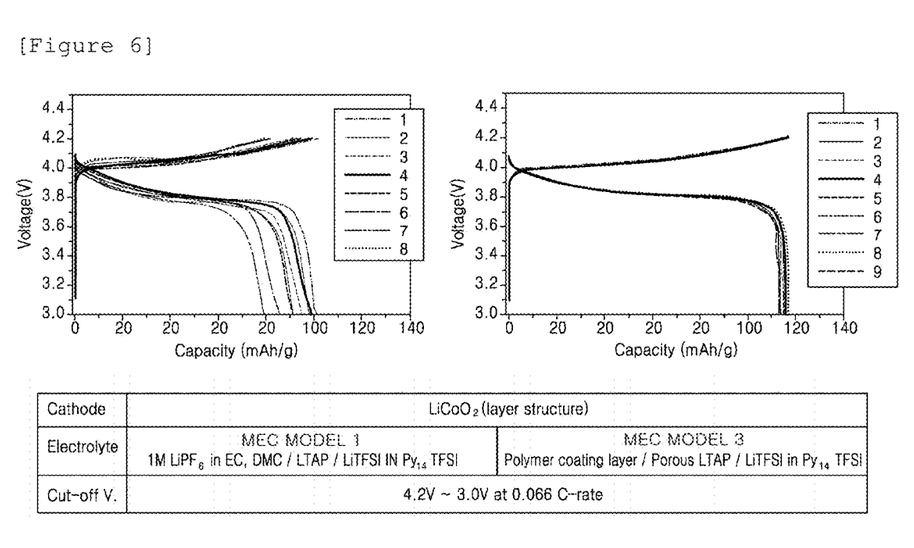
FIG. 6 illustrates a performance comparison test result between a multilayer electrolyte cell including a porous ceramic solid electrolyte prepared by the present invention and a multilayer electrolyte cell including a ceramic solid electrolyte without a pore.

FIG. 6 illustrates a performance comparison test result between a multilayer electrolyte cell including a porous ceramic solid electrolyte prepared by the present invention and a multilayer electrolyte cell including a ceramic solid electrolyte without a pore.

Referring to FIG. 6, pores are formed in the ceramic solid electrolyte, thereby enhancing a cell driving speed and improving cycle characteristics. Further, it can be seen that the cell driving speed is improved from the 0.025 to 0.033 C-rate to 0.066 C-rate, and as a cycle progresses, the capacity decrease is reduced and a reversible capacity may be ensured.

<Experimental Example 2>

Figure 7:
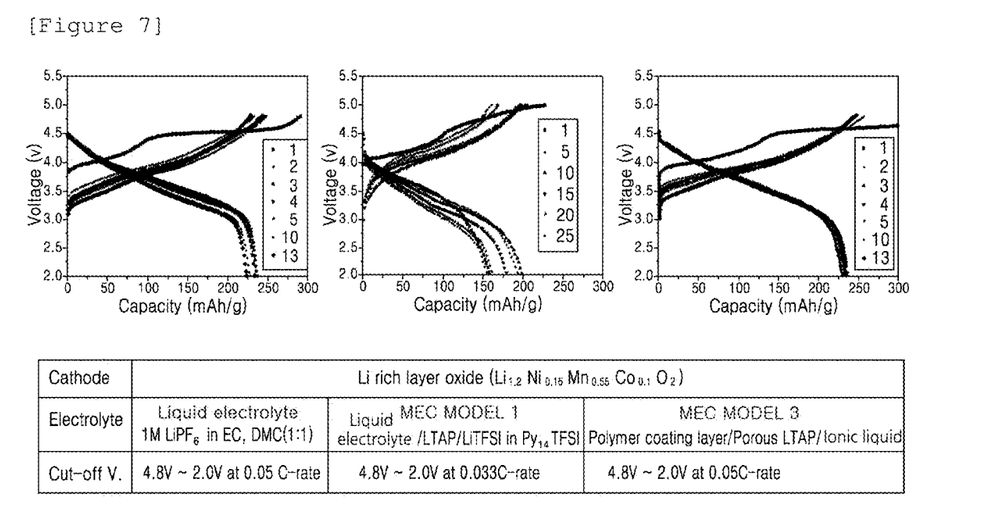
FIG. 7 illustrates a comparison test result of high voltage anode performance depending on a liquid electrolyte, a ceramic solid electrolyte, and a porous ceramic solid electrolyte.

FIG. 7 illustrates a comparison test result of high voltage anode performance depending on a liquid electrolyte, a ceramic solid electrolyte, and a porous ceramic solid electrolyte.

Referring to FIG. 7, the porous ceramic solid electrolyte has the enhanced cell driving speed and shows excellent cycle characteristics due to the impregnation of the ionic liquid. More specifically, when the 13th cycle is carried out, it is possible to ensure the reversible capacity compared to the liquid electrolyte, with a discharge capacity of 233.42 to 233.26 mAh/g.

The present invention has been described with reference to the preferred embodiments. However, it will be appreciated by those skilled in the art that various modifications and changes of the present invention can be made without departing from the spirit and the scope of the present invention which are defined in the appended claims.

The invention claimed is:

1. A cell having a multilayer electrolyte, the cell comprising:
   a ceramic solid electrolyte, wherein the ceramic solid electrolyte has a porous base structure including a Teflon-based binder and at least one inorganic ceramic, the porous base structure impregnated with an ionic liquid, wherein the at least one inorganic ceramic is selected from a group consisting of $LiLaTiO_3$ (LLTO), $Li_{1+x}Al_xTi_{2-x}(PO_4)_3$ (LTAP), $Li_7La_3Zr_2O_{12}$ (LLZO), and $Li_{1+x}Ti_{2-x}Al_xSi_y(PO_4)_{3-y}$ (where, $0<x<1$, $0<y<1$);
   an anode located on one side of the ceramic solid electrolyte;
   a cathode located on the other side of the ceramic solid electrolyte; and
   a polymer coating layer formed between the ceramic solid electrolyte and the cathode,
   wherein the polymer coating layer contacts the ceramic solid electrolyte and the cathode, and
   wherein the polymer coating layer is a single layer and consists of a polymer, a liquid electrolyte, a lithium salt, and an initiator.

2. The cell of claim 1, wherein the binder is polyvinylidene fluoride (PVDF).

3. The cell of claim 1, wherein the ionic liquid includes at least one of 1-ethyl-3-methyl imidazolium, 1-butyl-3-methyl imidazolium, 1-butyl-1-methyl pyrrolidinium, 1-methyl-1-proply piperidinium, bis (trifluoromethylsulfonyl) imide (TFSI), and trifluoromethanesulfonate.

4. The multilayer electrolyte cell of claim 1, wherein the anode includes any one of $LiNi_{0.5}Mn_{1.5}O_4$, $LiCoPO_4$, $LiNiPO_4$, and $Li_2CoPO_4F$.

5. The cell of claim 1, wherein the polymer includes any one of ETPTA, PEO, PAN, PVdF and PMMA, the liquid electrolyte includes any one of an ether-based liquid electrolyte and a carbonate-based liquid electrolyte, the lithium salt includes any one or more of $LiPFSi$, $LiPF_6$, $LiClO_4$, $LiAsF_6$, $LiBF_4$, $LiCF_3SO_3$, and $Li(CF_3SO_2)2N$, and the initiator includes 2-hydroxy-2-methylpropiophenone.

6. A secondary battery including the cell of claim 1.

7. The cell of claim 1, wherein the anode contacts the ceramic solid electrolyte.

8. A manufacturing method of a secondary battery including cell having a multilayer electrolyte, comprising:
   (a) forming a polymer coating layer on a cathode;
   (b) stacking a ceramic solid electrolyte on an anode; and
   (c) stacking the ceramic solid electrolyte and the cathode so that the polymer coating layer is positioned between the ceramic solid electrolyte and the cathode,
   wherein the cell comprises:
   the ceramic solid electrolyte, wherein the ceramic solid electrolyte has a porous base structure including a Teflon-based binder and at least one inorganic ceramic, the porous base structure impregnated with an ionic liquid, wherein the at least one inorganic ceramic is selected from a group consisting of $LiLaTiO_3$ (LLTO), $Li_{1+x}Al_xTi_{2-x}(PO_4)_3$ (LTAP), $Li_7La_3Zr_2O_{12}$ (LLZO), and $Li_{1+x}Ti_{2-x}Al_xSi_y(PO_4)_{3-y}$ (where, $0<x<1$, $0<y<1$);
   the anode located on one side of the ceramic solid electrolyte;
   the cathode located on the other side of the ceramic solid electrolyte; and
   the polymer coating layer formed between the ceramic solid electrolyte and the cathode,
   wherein the polymer coating layer contacts the ceramic solid electrolyte and the cathode, and
   wherein the polymer coating layer is a single layer and consists of a polymer, a liquid electrolyte, a lithium salt, and an initiator.

9. The manufacturing method of a secondary battery including a multilayer electrolyte cell of claim 8, wherein step (a) includes (a1) preparing a polymer coating solution by mixing any one or more of a high molecular polymer, a liquid electrolyte, a lithium salt, and an initiator.

10. The manufacturing method of a secondary battery including a multilayer electrolyte cell of claim 9, wherein step (a1) includes
    preparing an electrolyte mixture solution by mixing the high molecular polymer, the liquid electrolyte, and the lithium salt, and
    preparing a coating solution by mixing the initiator with the electrolyte mixture solution.

11. The manufacturing method of a secondary battery including a multilayer electrolyte cell of claim 10, wherein in step (a1), the high molecular polymer, the liquid electrolyte, and the lithium salt are mixed in a ratio of 40 to 60 wt %, 20 to 40 wt %, and 5 to 20 wt %, respectively.

12. The manufacturing method of a secondary battery including a multilayer electrolyte cell of claim 10, wherein in step (a1), the initiator is mixed in a weight ratio of 0.5 to 1.5% of a weight of the electrolyte mixture solution.

13. The manufacturing method of a secondary battery including a multilayer electrolyte cell of claim 8, wherein step (b) includes
    (b1) preparing a porous structure base,
    (b2) preparing the ceramic solid electrolyte by impregnating an ionic liquid in the porous structure base, and
    (b3) stacking the ceramic solid electrolyte on the anode.

14. The manufacturing method of a secondary battery including a multilayer electrolyte cell of claim 13, wherein step (b1) includes synthesizing ceramic powder by heat-treating a ceramic precursor,
    preparing a mixture solution by wet-mixing any one or more of the ceramic powder, a precursor, and a binder,
    generating mixture powder by spraying and drying the mixture solution,
    compressing the mixture powder, and
    forming the porous structure base by heat-treating the mixture powder.

15. The manufacturing method of a secondary battery including a multilayer electrolyte cell of claim 14, wherein in the synthesizing of the ceramic powder, the ceramic precursor is heat-treated at a temperature of 700 to 900° C.

16. The manufacturing method of a secondary battery including a multilayer electrolyte cell of claim 14, wherein in the preparing of the mixture solution, the mixture solution is mixed for 15 to 25 hours using any one of a ball mill, a rod mill, a vibrating mill, a centrifugal impact mill, a bead mill, and an attrition mill.

17. The manufacturing method of a secondary battery including a multilayer electrolyte cell of claim 14, wherein in the generating of the mixture powder, the mixture solution is sprayed and dried at a temperature of 100 to 200° C.

18. The manufacturing method of a secondary battery including a multilayer electrolyte cell of claim 14, wherein the compressing of the mixture powder includes
    mixing and compressing the mixture powder and a powder precursor, and
    compressing the compressed mixed powder and powder precursor by cold isostatic pressing.

19. The manufacturing method of a secondary battery including a multilayer electrolyte cell of claim 18, wherein in the mixing and compressing of the mixture powder and the powder precursor, the mixture powder and the powder precursor are compressed at a pressure of 20 to 50 MPa and
wherein in the compressing of the compressed mixed powder and powder precursor by the cold isostatic pressing, the mixture powder and the powder precursor are compressed at a pressure of 1500 to 2500 kg/cm$^2$.

\* \* \* \* \*